(12) United States Patent
Winchell et al.

(10) Patent No.: US 11,544,454 B2
(45) Date of Patent: Jan. 3, 2023

(54) METHOD, APPARATUS AND COMPUTER PROGRAM PRODUCT FOR DOCUMENT CHANGE MANAGEMENT IN ORIGINAL AND TAILORED DOCUMENTS

(71) Applicant: XSB, INC., Setauket, NY (US)

(72) Inventors: David Winchell, Port Jefferson, NY (US); Stanley Gregory, Bohemia, NY (US); Drew Weirshousky, West Sayville, NY (US)

(73) Assignee: XSB, Inc., Setauket, NY (US)

( * ) Notice: Subject to any disclaimer, the term of this patent is extended or adjusted under 35 U.S.C. 154(b) by 0 days.

(21) Appl. No.: 16/651,466

(22) PCT Filed: Sep. 28, 2018

(86) PCT No.: PCT/US2018/053406
§ 371 (c)(1),
(2) Date: Mar. 27, 2020

(87) PCT Pub. No.: WO2019/067888
PCT Pub. Date: Apr. 4, 2019

(65) Prior Publication Data
US 2020/0265189 A1 Aug. 20, 2020

Related U.S. Application Data

(60) Provisional application No. 62/565,527, filed on Sep. 29, 2017.

(51) Int. Cl.
*G06F 40/197* (2020.01)
*G06F 40/194* (2020.01)
(Continued)

(52) U.S. Cl.
CPC .......... *G06F 40/197* (2020.01); *G06F 3/0482* (2013.01); *G06F 3/04817* (2013.01); *G06F 40/166* (2020.01); *G06F 40/194* (2020.01)

(58) Field of Classification Search
CPC .... G06F 40/197; G06F 40/194; G06F 40/166; G06F 3/04817; G06F 3/0482
See application file for complete search history.

(56) References Cited

U.S. PATENT DOCUMENTS

| | | | |
|---|---|---|---|
| 6,061,697 A * | 5/2000 | Nakao | G06Q 10/10 715/229 |
| 2003/0237051 A1 | 12/2003 | Lamarca et al. | |
| 2005/0160355 A1 * | 7/2005 | Cragun | G06F 40/169 715/230 |

(Continued)

OTHER PUBLICATIONS

PCT Int'l Search Report and Written Opinion dated Dec. 7, 2018 in corresponding Application No. PCT/US2018/053406, 19 pages.

*Primary Examiner* — Jeremy L Stanley
(74) *Attorney, Agent, or Firm* — Ware, Fressola, Maguire & Barber LLP

(57) ABSTRACT

A method for maintaining modification management of a tailored document based on transcluded portions of one or more source documents, comprising determining modifications in each revision of each source document, storing said modifications, and notifying a user of the tailored document with respect to said determined modifications in each source document that are incorporated in the tailored document, wherein said modifications include any changes in the source documents between revisions of the source document.

30 Claims, 12 Drawing Sheets

(51) Int. Cl.
   *G06F 40/166*    (2020.01)
   *G06F 3/04817*   (2022.01)
   *G06F 3/0482*    (2013.01)

(56) References Cited

U.S. PATENT DOCUMENTS

| | | | |
|---|---|---|---|
| 2006/0136513 A1* | 6/2006 | Ngo | G06F 16/178 |
| 2008/0263442 A1* | 10/2008 | Plumley | G06F 40/197 |
| | | | 715/255 |
| 2009/0157608 A1* | 6/2009 | Strathearn | G06F 16/40 |
| 2009/0193012 A1 | 7/2009 | Williams | |
| 2009/0327991 A1 | 12/2009 | Weatherhead | |
| 2011/0055702 A1* | 3/2011 | Jakobson | G06F 40/197 |
| | | | 715/723 |
| 2011/0270834 A1 | 11/2011 | Sokolan et al. | |
| 2013/0185252 A1* | 7/2013 | Palmucci | G06F 40/197 |
| | | | 707/608 |
| 2014/0129645 A1* | 5/2014 | Mo | G06Q 10/101 |
| | | | 709/205 |
| 2014/0214825 A1 | 7/2014 | Zhang et al. | |
| 2014/0280204 A1* | 9/2014 | Avery | G06F 16/3334 |
| | | | 707/748 |
| 2014/0281872 A1* | 9/2014 | Glover | G06F 40/194 |
| | | | 715/229 |
| 2014/0281873 A1* | 9/2014 | Frew | G06F 16/00 |
| | | | 715/229 |
| 2014/0365886 A1* | 12/2014 | Koenig | G06F 3/04855 |
| | | | 715/711 |
| 2015/0378972 A1* | 12/2015 | Kapadia | G06F 16/93 |
| | | | 715/229 |
| 2016/0188686 A1* | 6/2016 | Hopkins | G06F 16/24573 |
| | | | 707/602 |
| 2017/0076151 A1* | 3/2017 | Roy | G06K 9/6282 |
| 2017/0199657 A1* | 7/2017 | Mullins | G06F 3/04842 |
| 2017/0357852 A1* | 12/2017 | Cai | G06K 9/6215 |
| 2020/0311406 A1* | 10/2020 | Tazzini | G06F 40/205 |

* cited by examiner room temperature. Upon completion of the thermal cycling, the straight specimen shall be wrapped over its own diameter for eight close turns in a manner identical to that of the first specimen. Both wrapped specimens shall then be tested for continuity of coating in accordance with the procedure as specified in ASTM-B355.

From MIL-DTL-87020 D Section 4.7.3.4

4.7.3.4 Capacitance A test specimen consisting of 1 piece of completed cable, not less than 36 inches (914 mm) in length, shall be dried in an oven at a temperature of 176±4°F for 18 hours. After removal from the oven and cooled to room temperature, the specimen shall be immersed in mercury with each end of the specimen protruding 2 inches (50.8 mm). The capacitance shall be measured between the conductor of the specimen and the mercury by means of a capacitance bridge, at a frequency of 1,000 Hz.

From MIL-DTL-87020 D Section 4.7.3.5.3.4

4.7.3.5.3.4 Antifreeze compound At the conclusion of the aviation turbine fuel test specified in 4.7.3.5.3.3, the specimen, with mandrel and sleeve in position, shall be immersed for 2 hours in antifreeze compound conforming to ASTM-D3306, maintained at 185±5°F. After immersion, specimen shall be drained for 30 minutes and immediately subjected to the voltage application test Portion of tailored document showing transcluded sections from revision D, along with change notification icons on the left side of the section headers.

FIGURE 7

Pop-up on change notice (text notification) from previous figure (Figure 7) showing that a newer revision (F) is available.

From MIL-DTL-3702D Section 4.7.3.4

4.7.3.4 Capacitance A test specimen consisting of 1 piece of completed cable, not less than 36 inches (914 mm) in length, shall be dried in an oven at a temperature of 176±4°F for 18 hours. After removal from the oven and cooled to room temperature, the specimen shall be immersed in ~~watercuny~~ with each end of the specimen protruding 2 inches (50.8 mm). The capacitance shall be measured between the conductor of the specimen and the ~~watercuny~~ by means of a capacitance bridge, at a frequency of 1,000 Hz.

Section of tailored document with red-line changes between D and F shown

New revision:

MIL-DTL-53072F DETAIL SPECIFICATION CHEMICAL AGENT RESISTANT COATING (CARC) SYSTEM APPLICATION PROCEDURES AND QUALITY CONTROL INSPECTION

The included content has been changed. Go to Change

— 41

43 → ore application to steel, aluminum or other at process specified by the manufacturer. e part is electrically connected to an earth . Be sure to read and follow all safety d injuries associated with electrical

From MIL-DTL-53072C Section 1.1

1.1 <u>Scope</u> This document covers the general requirements for application and inspection of the chemical agent resistant coating (CARC) system used on tactical military equipment. It is intended for use as a guide in selection of the appropriate materials and procedures, and as a supplement to information available in the below referenced cleaning, pretreating, and coating specifications. The document also includes information on touchup/repair, health and safety guidelines, environmental restrictions, national stock numbers (NSN) for CARC and CARC-related materials, and application equipment and techniques (see 6.5).

FIGURE 11

From MIL-DTL-53072E Section 3.4.7.5

3.4.7.5 Application All surfaces shall be properly cleaned and pretreated before application to steel, aluminum or other substrates. The powder coatings are applied and cured using the powder coat process specified by the manufacturer. This is generally an electrostatic application of the powder material, where the part is electrically connected to an earth ground and the powder is positively or negatively charged during application. Be sure to read and follow all safety instructions provided by the manufacturer with the powder equipment to avoid injuries associated with electrical current flow.

From MIL-DTL-53072G Section 1.1

1.1 Scope This document covers the ~~general~~ requirements for application and inspection of the ~~chemical agent resistant coating~~ (CARC) systems used on ~~tactical~~ military equipment. It is ~~intended~~ required for use ~~as a guide~~ in the ~~in~~ selection process of the appropriate materials and procedures ~~and~~ for the surfaces to be painted, and provides a ~~supplement~~ additional application, inspection, and quality control information ~~available for~~ for the below referenced cleaning, pretreating, and coating specifications. This document ~~also includes information~~ does not alleviate the need for proper consideration of corrosion ~~issues, prevention and safety guidances, environmental regulations~~ control (e.g. material selections, ~~national stock numbers (NSN) for CARC and CARC related~~ system design, manufacturing processes, maintenance, and ~~applicable~~ other consideration ~~equals~~ during vehicle development and maintenance ~~(see 6.5 nance)~~.

From MIL-DTL-53072G Section 3.5.2.2

3.5.2.2 Use MIL-C-53039 is intended to provide a film which can be easily and effectively decontaminated after exposure to liquid chemical agents. It can be applied over any of the five epoxy primers described in 3.4, or to a CARC basecoat which is at least set to touch, as in pattern painting, or to a completely cured and thoroughly cleaned existing finish, as in rework. It should not be applied over an existing alkyd or lacquer finish. As a camouflage topcoat, it should be applied to exterior surfaces and interior surfaces routinely visible from the outside, e.g., door ramps, hatches, etc.

FIGURE 12

METHOD, APPARATUS AND COMPUTER PROGRAM PRODUCT FOR DOCUMENT CHANGE MANAGEMENT IN ORIGINAL AND TAILORED DOCUMENTS

CROSS-REFERENCE TO RELATED APPLICATION

This application is the U.S. National Stage of International Application No. PCT/EP2018/053406 filed on Sep. 28, 2018, which application claims priority under 35 USC § 119 to U.S. Provisional Patent Application No. 62/565,527 filed on Sep. 29, 2017. Both applications are hereby incorporated by reference in their entirety.

TECHNICAL FIELD

The present invention is directed to a method and apparatus for mining data and reorganizing the data specifically with respect to generation and maintenance of transcluded documents (sometimes referred to as tailored documents) as discussed in applicant's U.S. application Ser. No. 14/653,018 filed Jun. 17, 2015, whose contents are incorporated by reference.

BACKGROUND OF THE INVENTION

Documents, including standards documents (documents associated with various standard organizations, such as ASTM International, etc.) and military specification can be analyzed and reorganized into a structure that allows automated dissemination of the information contained therein.

Thus, it is known that a method and system can organize, store and disseminate knowledge contained in a collection of standards documents that organizes subjects and requirements defined in those documents as an ontology and wherein the system is embodied, such as on a computer readable medium coupled to a processor, so as to annotate and convert documents in order to create a shared structured syntactic model of the documents, to create an ontology directed to a semantic tagger that creates a shared structured semantic model of the documents, a database for storing the documents syntactic and semantic models as objects in the ontology, as well as an interface permitting interrogation of the database.

Included in such systems and methods is the ability to create what is known as a transcluded (tailored) document; that is, a document that combines portions from multiple standards documents so as to form a tailored document.

SUMMARY OF THE INVENTION

The present invention is an improvement to such creation of a tailored document using transclusion. A tailored document is created by selection of portions of one or more source documents, such portions being, for example, paragraph, sections, tables, or chapters of one or more source documents, so as to create a tailored document. Modifications (changes) to a source document are referred to herein as revisions or versions of the source document. Such modifications to a source document can include changing a portion of the source document, adding a portion to the source document, or deleting a portion of the source document.

As described below, an important feature of the document management system according to the present invention is its ability to efficiently evaluate the impact of external changes on enterprise processes or requirements. For example, in manufacturing, a specification document (i.e., a source document directed to a specification) describing a manufacturing process that varies depending on material or other conditions, may be used for task-specific work instructions. Work instructions are created in a tailored document by including applicable paragraphs from the process specifications in the source document. The source process specifications may change frequently to reflect new practices, handle errors, defects, etc. Content from a single process specification may be used in hundreds of work instructions. Furthermore, the derivative work instructions may be copies and the copies further modified across an enterprise.

Changes to a specific paragraph in an original process specification document may affect only a few work instructions. For safety and performance reasons, these work instructions must be reviewed, changed impact evaluated and changes applied as necessary.

The present invention provides a unique solution to this problem by not only storing all modifications in source documents between revisions of the source document, but further notifying the user when and only when a change to a specific portion (e.g., a paragraph or a table cell) in a process specification affects their own work instructions (transcluded document) and allow them to visually evaluate whether the change is material (e.g., a syntax correction vs. introduction of a verification step). This reduces errors occurring due to the use of outdated work instructions and significantly decrease the effort of keeping them up-to-date.

In particular, the present invention is directed to the feature that when modifications are made to any of the source documents (changes to existing portions, additions, or deletions to portions of any of the source documents), the changes made in the source documents are recorded with respect to and between each revision of the source documents. Thus, a tailored document can be efficiently revised as source documents are revised. Such revisions to the tailored document can be performed automatically by the document management system or can be shown to a user for user selection of same or not.

Thus, when a source document revision occurs, changes are calculated for every other existing version of that source document. For example, when version 3 is created, changes between version 2 and version 3 are calculated and changes between version 1 and version 3 are calculated. In view of the fact that a version 2 already exists, the present invention further has already determined through its operation changes between version 1 and version 2.

The results of the calculations are stored in the document management system for each portion of the source document, including sections, titles, paragraphs and labels. Tables are included down to the level of individual cells. Changes are stored in one of three forms, namely, "deleted in", "modified in", or "added in".

For example, if section 2.1 in version 1 of the source document is modified in version 3, this would represent a "modified in" change.

If section 3 in version 1 of the source document is deleted in version 3 of the source document, it would be noted as "deleted in".

If paragraph 2.2.x is added to the source document in version 3, it would be noted as "added in".

In the case of "added in" relationships, information with respect to the location of the addition, relative to elements in the earlier versions of the source document are also stored in the document management system.

Because the structure of the source documents is hierarchical, changes may be inherited. For modifications, inheritance is in an "upward" direction (that is, for example, section 2.1 of a source document modified in the latest version (revision) of the source document implies that section 2 is also modified from the previous version).

For deletions, the document hierarchy is "downward"; that is, for example, if section 2 of a source document is deleted in the current version of the source document, this implies that any subsection of section 2, such as section 2.1 if it exists, is also deleted. Such inherited relationships are calculated and stored either explicitly or inferred by the process that uses the data. All such modifications in each source document included in a tailored document are viewable by the registered user of the source document if the modification(s) in the source document involve portions of the source document transcluded in the tailored document.

If a portion of the source document is contained in the tailored document, a notification is sent to registered users of the tailored document. Such changes in portion(s) of the source document included in the tailored document are viewable by the registered user. This process is performed for each source document (e.g., source documents #1, #2, etc.) that is transcluded (used in) in the tailored document.

When a tailored document is displayed, a user then receives a notification for each such modification forming part of the tailored document. The notification can indicate whether a portion of a source document has changed in a subsequent version (revision) of the source document. The user can optionally see such changes in a "red-line fashion" on the display screen with such edited portions generated using the stored change information described above. The overall method and apparatus and computer program product according to the present invention thus provides for a readily discernible history of the tailored document in relationship to all changes made in the source documents forming the tailored document to the extent that modifications made in those source documents are incorporated into the tailored document.

Thus, an embodiment of the present invention is a method for maintaining modification management of a tailored document based on transcluded portions of one or more source documents, comprising determining modifications in each revision of each source document, storing said modifications, and notifying a user of the tailored document with respect to said determined modifications in each source document that are incorporated in the tailored document, wherein said modifications include any changes in the source documents between revisions of the source document.

Another embodiment of the present invention is the method as described above, wherein the step of determining modifications in each revision of each source document includes calculating the difference between successive revisions of each source document.

Another embodiment of the present invention is the method as described above, wherein the step of notifying includes displaying revised transcluded portions of the tailored document for portions of a source document that have changed between revisions of the source document.

A further embodiment of the present invention is the method as described above, wherein the revised transcluded portions of the source documents included in the transcluded document are displayed in a red-line manner.

A still further embodiment of the present invention is the method as described above, further comprising receiving user input regarding which, if any, of the modifications shall be incorporated in the tailored document.

Another embodiment of the present invention is the method as described above, wherein the step of notifying includes generating icons that identify the type of modification.

Another embodiment of the present invention is the method as described above, wherein the icons include an icon indicating that text in a portion of the tailored document has changed, another icon indicating that no change in a portion of the tailored document has occurred, and a further icon indicating that a portion of the tailored document has been deleted in the revision of the source document.

A further embodiment of the present invention is the method as described above, where the icons have different colors.

A further embodiment of the present invention is the method as described above, wherein the step of notifying includes displaying text notifications.

Another embodiment of the present invention is the method as described above, wherein each source document is hierarchical in structure and wherein each portion of the source document modified is inherited upwards and each portion of the source document modified by deletion is inherited downwards.

Another embodiment of the present invention is an apparatus for maintaining modification management of a tailored document based on transcluded portions of one or more source documents, comprising a data storage including storage of a computer program code, a central processing unit communicating with the data storage, the central processing unit under program control, a display in communication with the central processing unit, the central processing unit configured to cause the apparatus to determine modifications in each revision of each source document, and notify a user of the tailored document with respect to said determined modifications in each source document, wherein said modifications include any changes in the source documents between revisions of the source document.

A further embodiment of the present invention is the apparatus as described above, wherein the determined modifications in each revision of each source document includes calculating the difference between successive revisions of each source document.

A still further embodiment of the present invention is the apparatus as described above, wherein the notifying includes displaying revised transcluded portions of the tailored document for portions of a source document that have changed between revisions of the source document.

Another embodiment of the present invention is the apparatus as described above, wherein the revised transcluded portions of the source documents included in the transcluded document are displayed in a red-line manner.

Another embodiment of the present invention is the apparatus as described above, further comprising a user interface to receive user inputs, including user input with respect to which, if any, of the modifications should be incorporated in the tailored document.

A further embodiment of the present invention is the apparatus as described above, wherein said notify a user includes generating icons that identify the type of modification.

A further embodiment of the present invention is the apparatus as described above, wherein the icons include an icon indicating that text in a portion of the tailored document has changed, another icon indicating that no change in a portion of the tailored document has occurred, and a further icon indicating that a portion of the tailored document has been deleted in the revision of the source document.

Another embodiment of the present invention is the apparatus as described above, where the icons have different colors.

Another embodiment of the present invention is the apparatus as described above, wherein said notify a user includes displaying text notifications.

A further embodiment of the present invention is the apparatus as described above, wherein each source document is hierarchical in structure and wherein each portion of the source document modified is inherited upwards and each portion of the source document modified by deletion is inherited downwards.

Another embodiment of the present invention is a computer program product embodied on a non-transitory computer readable memory, comprising computer program code configured to perform maintaining modification management of a tailored document based on transcluded portions of one or more source documents, and further configured to determine modifications in each revision of each source document, and notify a user of the tailored document with respect to said determined modifications in each source document, wherein said modifications include any changes in the source documents between revisions of the source document.

Another embodiment of the present invention is the computer program product as described above, wherein the step of determining modifications in each revision of each source document includes calculating the difference between successive revisions of each source document.

A further embodiment of the present invention is the computer program product as described above, wherein the step of notifying includes displaying revised transcluded portions of the tailored document for portions of a source document that have changed between revisions of the source document.

Another embodiment of the present invention is the computer program product as described above, wherein the revised transcluded portions of the source documents included in the transcluded document are displayed in a red-line manner.

A further embodiment of the present invention is the computer program product as described above, further configured to receive user inputs, including user input with respect to which, if any, of the modifications should be incorporated in the tailored document.

A still further embodiment of the present invention is the computer program product as described above, wherein said notify a user includes generating icons that identify the type of modification.

Another embodiment of the present invention is the computer program product as described above, wherein the icons include an icon indicating that text in a portion of the tailored document has changed, another icon indicating that no change in a portion of the tailored document has occurred, and a further icon indicating that a portion of the tailored document has been deleted in the revision of the source document.

Another embodiment of the present invention is the computer program product as described above, wherein the icons have different colors.

A further embodiment of the present invention is the computer program product as described above, wherein said notify a user includes displaying text notifications.

Another embodiment of the present invention is the computer program product as described above, wherein each source document is hierarchical in structure and wherein each portion of the source document modified is inherited upwards and each portion of the source document modified by deletion is inherited downwards.

BRIEF DESCRIPTION OF THE DRAWINGS

For a better understanding of the nature and objects of the present invention, reference is made to the following detailed description taken in conjunction with the following drawings in which:

FIG. 7 is a screenshot of a portion of a tailored document showing transcluded portions (sections) from a revision D of a source document, along with change notification icons on the left side of the section headers (example shown in color).

FIG. 9 is a screenshot of a section of a tailored document with red-line changes with respect to the differences between revisions D and F of a source document (shown in color).

FIG. 10 is a screenshot of a part of a tailored document with red-line changes illustrated (shown in color).

FIG. 11 is a screenshot of a notification to a user when a new revision of a source document has been processed by the document management system.

FIG. 12 is a screenshot of a part of a tailored document with green, yellow and red notification icons and showing red-line changes as a result of user selection of a red-line display (see red-line display icon in FIG. 11).

DETAILED DESCRIPTION

Figure 1:
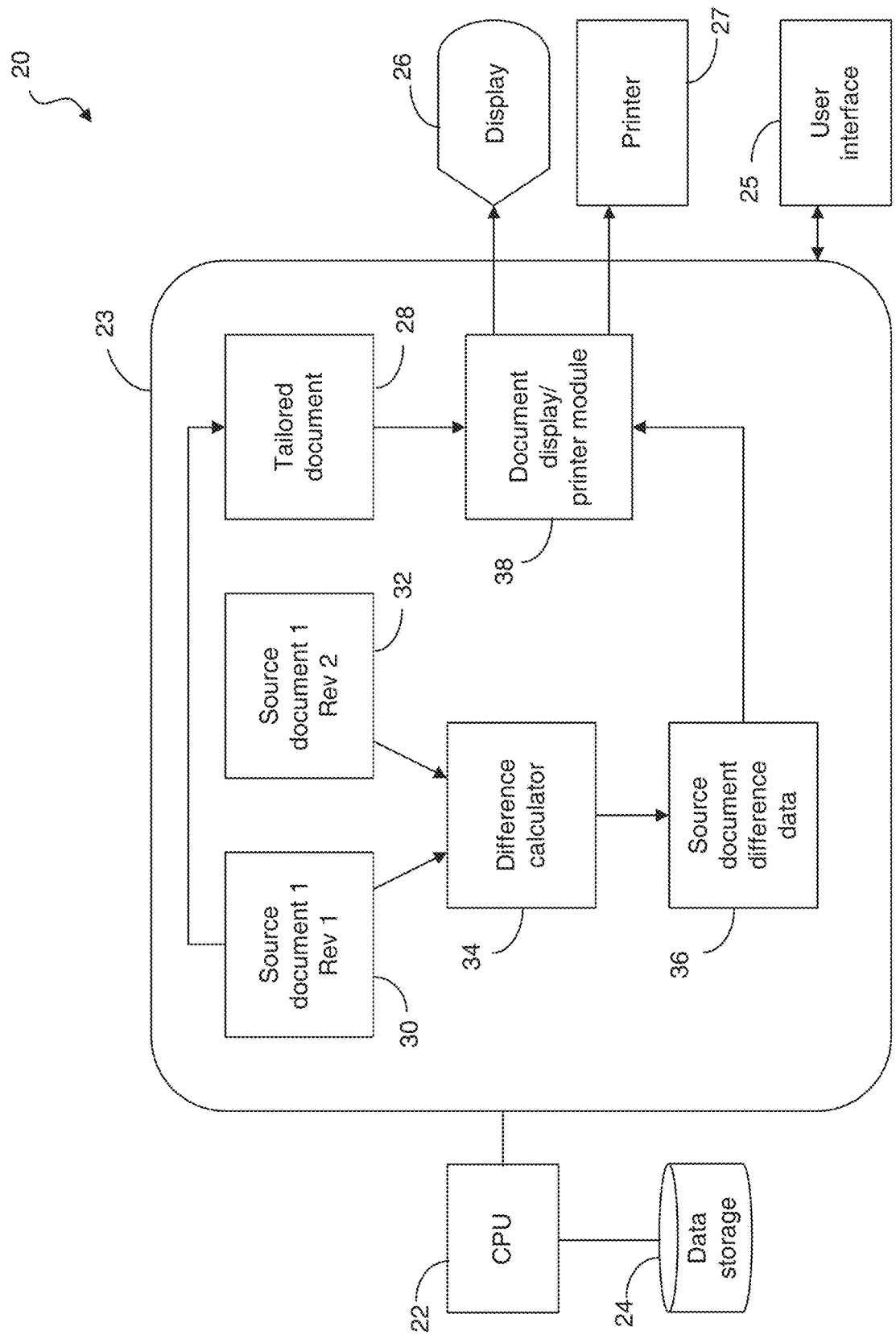
FIG. 1 is a block diagram of an embodiment of a system according to the present invention.

FIG. 1 shows an overall document management system 20 for generation of tailored documents with document change management according to the present invention. As seen in FIG. 1, the apparatus includes a CPU 22, a data storage 24 and a module 23 shown in a dotted area. This module represents computational features of the invention performed by the CPU under programmed instructions. It also illustrates an example of a tailored document 28 that is based on source document 1, which in the example shown, has an initial version (Rev 1) and a later second version (Rev 2). The document management system interfaces with a display 26 and/or a printer 27, the display for viewing all or a portion of a tailored document. A document display/printer module 38 controls display and/or printing of a tailored document, such as tailored document 28 diagrammatically shown in FIG. 1. Module 23 also has a difference calculator 34 and a source document difference data module 36. A user interacts with the data management system via a user interface 25, which can be over the Internet or the like.

The overall generation of tailored documents uses transclusion of source documents. Such transclusion can be based on Semantic Web for Interoperable Specifications and Standards (SWISS™) for converting documents (such as specification documents) into interoperable semantic web linked data models and related tools such as Spectacle™ software application that provides a web user interface to such linked data models. See, for example, US Published Patent Application 2016-0188686 for implemented transcluded compositions. Although generation of transcluded documents is known, the present invention is able to create an improved tailored document by automatically determining not only differences between versions of a source document, but also whether such revision affect any portion of a tailored document, and if so, how. By so doing, the creator and user of a tailored document is able to know with confidence that the tailored document accurately contains all relevant changes that results from revision of one or more source documents. Such accuracy is extremely important, especially when the tailored document contains specifications, safety procedures and the like with respect to manufacturing, testing and/or using a product or device, including products/devices manufactured for military and other governmental purposes.

FIG. 1 also shows an example where a tailored document 28 exists which includes one or more sections of Source document 1. The initial source document (Rev 1, reference numeral 30) and later revision(s) (Rev 2, reference numeral 28) and tailored document 28 are shown diagrammatically in FIG. 1. The illustrated blocks represent data with respect to these documents, as actually stored in data storage 24. The tailored document of course may include other sections of source document 1, as well as sections from other source documents (not shown). In the block diagram example of FIG. 1, Source document 1, Rev 1 (source document 1, Revision 1) has been updated to Source document 1, Rev 2. In that particular case, the difference between revision 1 and revision 2 is determined by a difference calculator 34. The difference calculator determines the differences between revision 1 and revision 2 of source document 1 and presents the source difference data in module 36. This source difference data is determined for each portions of the source document, including those portions (if any) associated with the tailored document 28 and is presented to the document display/printer module 38. Thus, the document display/printer module takes the original tailored document derived from source document 1, Revision 1 and combines the tailored document with the source document difference data 36 so as to present information onto display 26 and/or printer 27 regarding all changes of the source document(s) that are transcluded in the tailored document.

Figure 10:
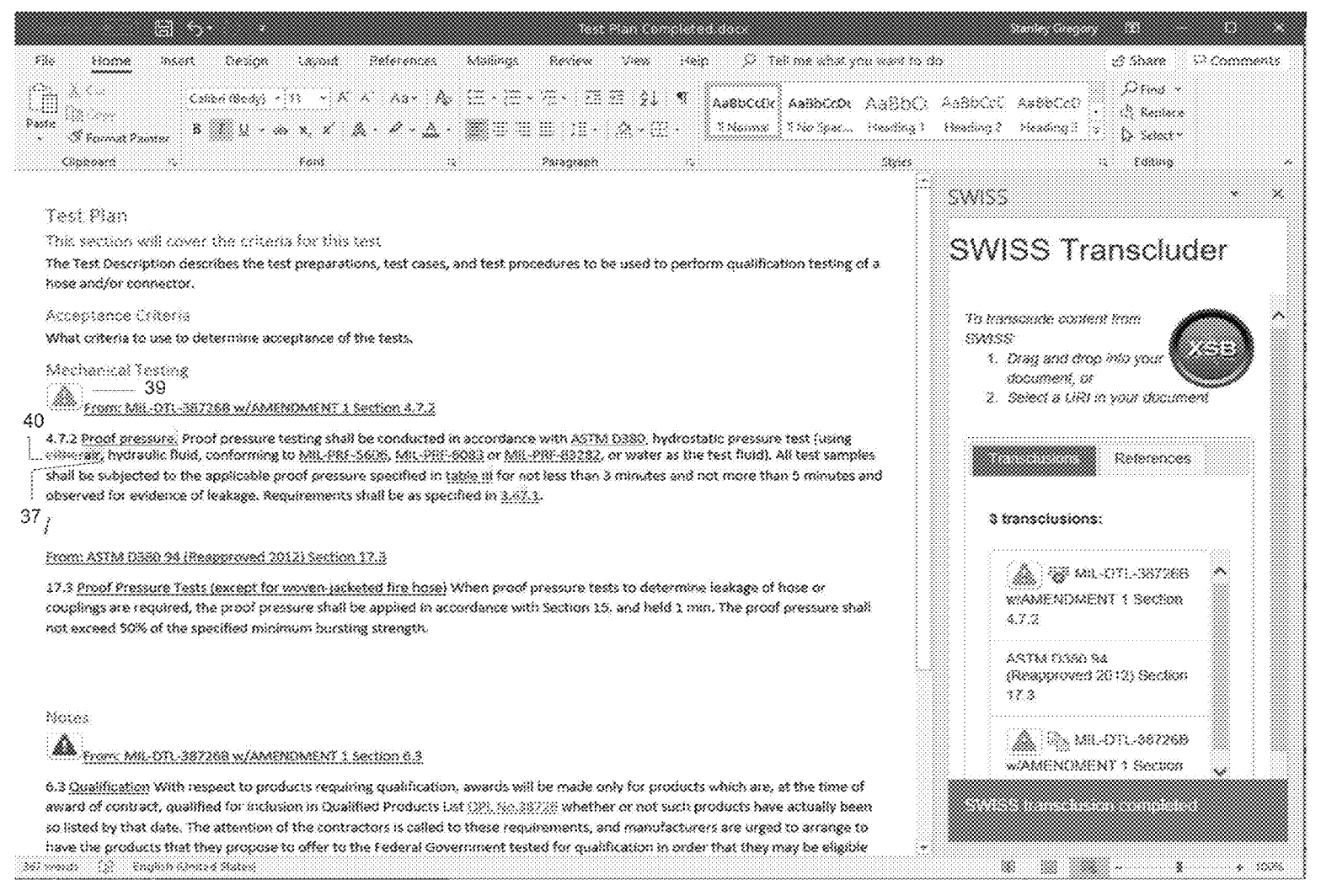

The procedure shown in FIG. 1 is with respect to all portions of source document 1 that have changed between revisions, including portions of source document 1 used in tailored document 28. The information presented to the user on display 26 or printer 27 thus is the information concerning each portion from each source document for which some change, deletion or addition has occurred as it relates to the tailored document. The information displayed can be in what is known as a "red-line format"; that is, where additions are shown in one format (such as green shading 37—see FIG. 10), deletions shown in another format (red strikeout 40), and notices of such changes shown by an icon 39—here shown in yellow) for each portion of each source document forming the tailored document. Such use of red-line format is shown in FIGS. 7-10. FIGS. 7, 10 and 12 show such changes in color. Color icons 39 are typically used as shown in FIGS. 10-12, with yellow indicating a change in a portion, red indicating a deletion of a portion, and green indicating that the changes between the latest version of the source document and the earlier version does not affect the tailored document.

This procedure with regard to changes in each portion of each source document forming the tailored document is performed whenever any source document is revised. In addition, to the extent that those revisions affect one or more portions of that source document incorporated in the tailored document, the changes are stored not only with respect to the latest revision of that source document, but also for each previous revision of that source document. In this manner, the user of the data management system can review such changes between revisions of each source document and determine if a particular revision of the source document should be included in the tailored document. Thus, for example, if Source document 1 has a third revision (Rev 3), but the portions revised have no material affect with respect to the tailored document, the user could decide to not incorporate those changes into the tailored document. Such decisions could not be easily determined without the feature of the present invention that maintains a history of other changes between all revisions of each source document.

In addition to displaying the revision between, for example, Source document 1, revision 1 and Source document 1, revision 2 and subsequently Source document 1, revision 3; if desired, the difference between any portion of Source document 1 can be displayed which are incorporated in the tailored document between revision 2 and revision 3, for example. The change in each portion of the source document forming part of the tailored document are determined and saved by the document management system between the source document's earliest revision as set forth in the tailored document and the latest version of that source document. Such changes can be displayed on display 26 (FIG. 1).

Thus, in the example where source document 1 has been revised from revision 1 to revision 2 and then again in revision 3, the document display module presents to the user the revision of each portion of that source document incorporated in the tailored document from the earliest revision (rev 1) to the latest revision (rev 3). The source difference data maintains difference data for each source document version, including those portions incorporated in the tailored document, starting from the initial version of the source document.

The apparatus, method and computer program product of the present invention also provides for the ability to track the deletion of a portion of a source document where that portion was previously incorporated into the tailored document. Thus, for example, if section 2 of Source document 1, Rev 1 is initially incorporated in the tailored document 28 and then revision 2 of Source document 1 deletes section 2, then that information is also presented via the document display module to display 26. It should be noted that the information in the portions shown in the tailored document are hierarchical in nature.

Thus, in the example given where section 2 of Source document 1, revision 1 is incorporated in the tailored document, if section 2 incorporates subsections (such as, subsection 2.1, subsection 2.2, etc.), those sub-sections are also shown as deleted when revision 2 of source document 1 deletes section 2.

In view of the fact that the operation of the present invention is hierarchical in nature with respect to the portions of the source documents included in the tailored document, then, for example, if the tailored document incorporates section 2 of Source document 1, revision 1 and if revision 2 of Source document 1 modifies subsection 2.1 of section 2, then that modification in the subsection is presented to the document display 26 since the hierarchy with regard to the modification is upward in nature.

Figure 2:
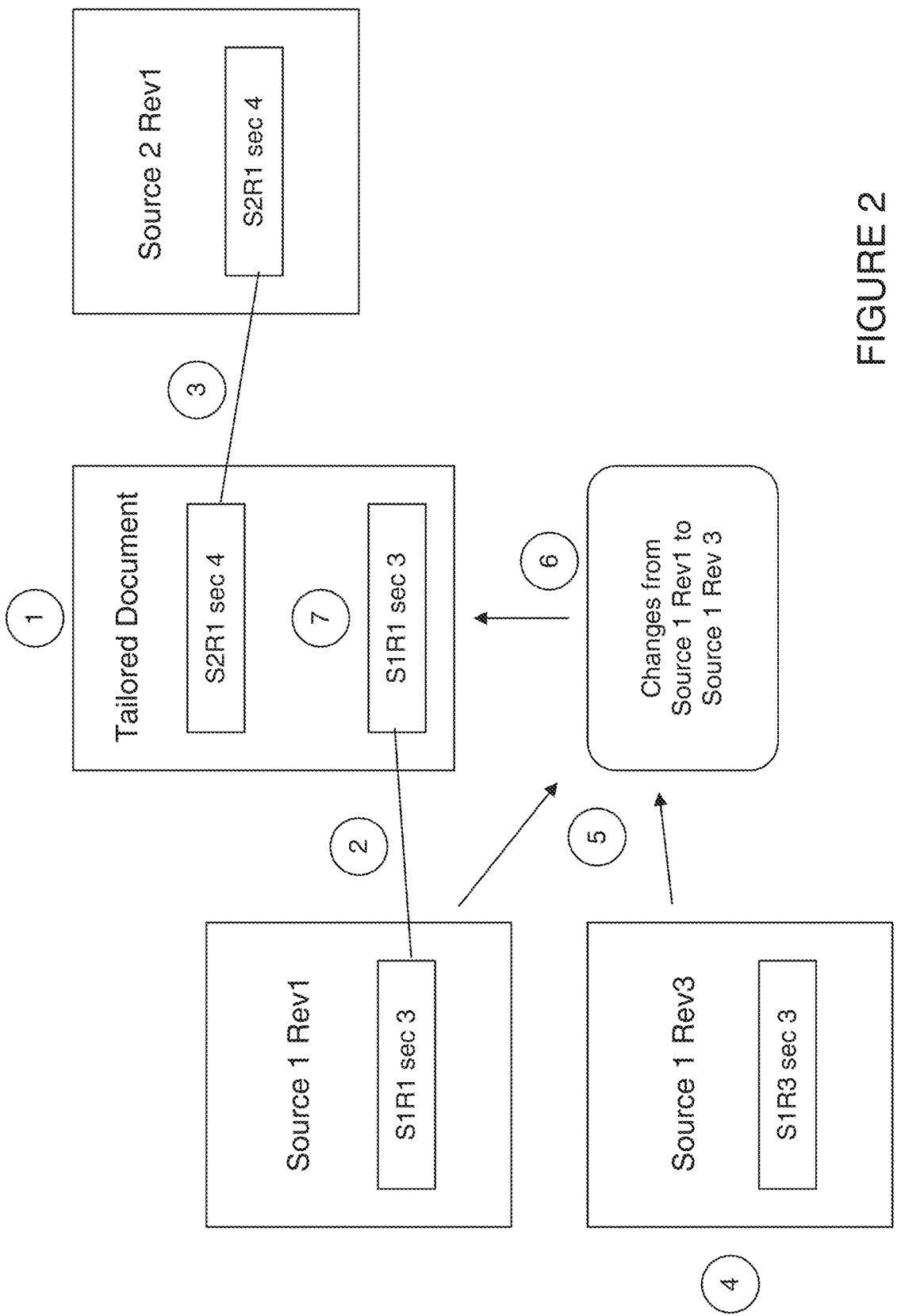
FIG. 2 is a flow analysis for an example associated with the creation of a tailored document.
Figure 3:
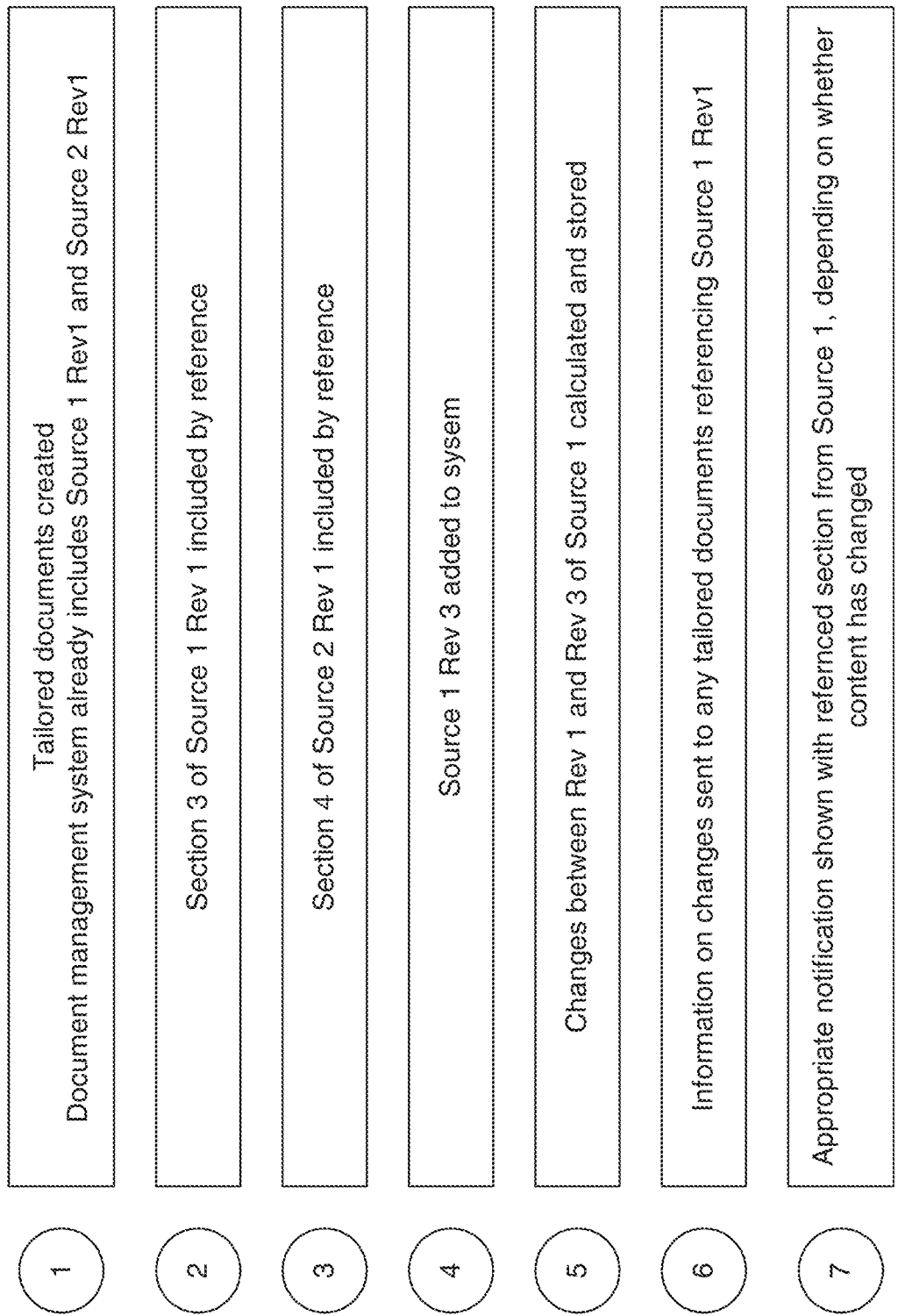
FIG. 3 is an explanation of the numerical steps shown in FIG. 2.

FIGS. 2 and 3 present another example of the operation of the document management system. The circled numbers in FIG. 2 correspond to the circled numbers in FIG. 3.

Thus, circle 1 represents a tailored document that comprises Source document 1, revision 1, section 3 (S1R1 sec 3) and Source document 2, revision 1, section 4 (S2R2 sec 4). As used herein, please note that the terms "version number" and "revision number" are used interchangeably herein with respect to the source documents.

Thus, FIG. 2, circled number 2 shows that section 3 of Source document 1, revision 1 is in the tailored document, while circled number 3 shows that Source document 2, revision 1, section 4 is included in the tailored document.

Circled number 4 shows that the Source document 1 later has a revision 3 in which section 3 has been modified. Circled number 5 shows that the differences between Source document 1, revision 1, section 3 and Source document 1, revision 3, section 3 are presented to a module (circled number 6) which in turn presents the change information to the tailored document for ultimate display via the document display module (see FIG. 1). In the example shown in FIGS. 2 and 3, Source document 2, revision 1 has not been changed so no change information is presented regarding source document 2.

Figure 4:
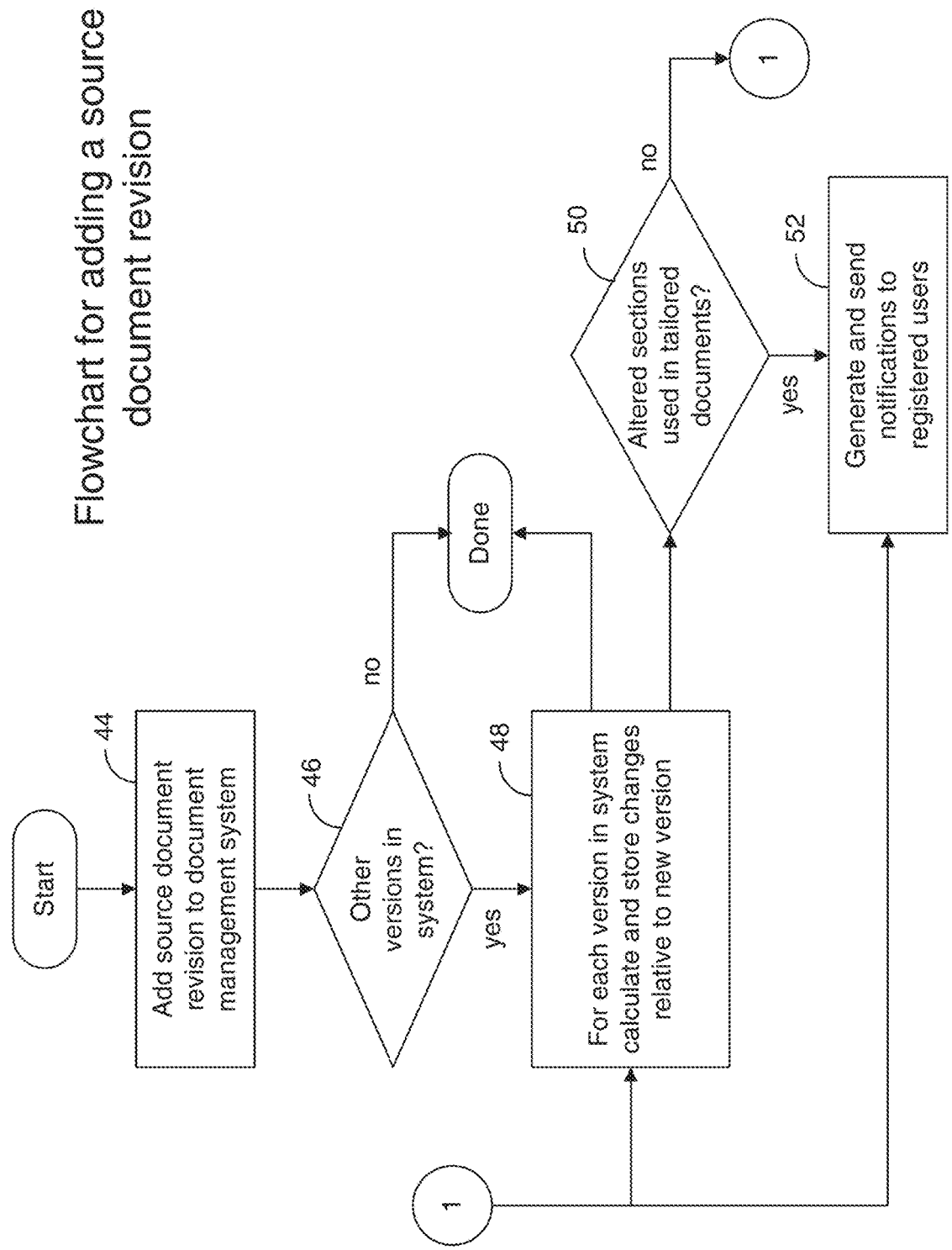
FIG. 4 is a flow chart for adding a source document revision to the document management system which may be used in a tailored document.

FIG. 4 is a flow chart showing source document revision, that is, where a new version of a source document has occurred. Thus, at step 44, a source document revision has occurred and is presented to the document management system 20. At decisional step 46, it is determined whether older versions of the source document are in the document management system. If the answer is YES, the flow chart proceeds to steps 48 and 50 where for each revision of the source document in the document management system, a calculation is made concerning changes relative to the new revision; with those changes stored in data storage 24 (see FIG. 1).

The output of module 48 is presented to decisional step 50 where a determination is made as to whether portions of the latest revision of the source document are used in the tailored document. If the answer to decisional block 50 is YES, a notification is generated and sent to registered users associated with the tailored document, step 52.

At this point, the flow chart returns to step 1; that is, to calculate and store changes with respect to the latest revision of the source document for each changed portion of the source document. The method as shown in FIG. 4 thus sequentially goes through each portion of the source document that has been changed to determine whether that changed portion of the source document is used in the tailored document and, if so, to generate and send a notification to the user.

Further with respect to FIG. 4, when a source document is revised, a procedure is invoked which determines the changes between the latest revision of the source document and all previous revisions of that same source document. Thus, when a source document revision is made, that source document revision is added to the document management system and stored in data storage 24 (see FIG. 1). This is shown at step 44 in FIG. 4.

At decisional step 46, it is determined if other versions of the source document are already in the system (that is, in data storage 24). If the answer is NO, then that revision represents the first version of the source document and the flow chart then ends at step 54 (DONE).

If however other versions of the source document are already in the document management system, then the answer to decisional step 46 is YES and the flow chart proceeds to step 48. At step 48, for each previous version (revision) of the source document, the document management system calculates and stores the changes relative to the latest revision (version). Thus, for example, if a particular source document has three revisions (rev 1, rev 2, rev 3) and revision 3 is currently being added at step 44, then changes between version 1 and version 3 are calculated and stored by the document management system in data storage 24 and changes between revision 2 and revision 3 are calculated and stored in data storage 24.

Please note that the system has already determined the differences between revision 1 and revision 2 since previously revision 2 would have been processed subject to the flow chart shown in FIG. 4 and thus the differences between revision 2 and revision 1 would already be determined and stored in the data storage.

The results of the calculation of the differences between revision 1 and revision 3, as well as revision 2 and revision 3, for each portion of the document, including sections, titles, paragraphs, labels, etc., are determined.

In this regard, tables, if present in the source document, are included down to the level of individual cells within that table.

Changes are then stored in one of three forms; namely, "deleted in", "modified in", or "added in".

For example, if the source document has a section 2.1 and if section 2.1 is modified in version 3, this would represent a "modified in" change.

If section 3 of the source document in version 1 is deleted in version 3, then the deletion of section 3 from the source document would be the calculated difference between version 1 and version 3 with respect to section 3. This would represent a "deleted in" form.

Finally, if a paragraph 2.2.*x* is added to section 2 of the source document in version 3, this would represent a "added in" form and this addition would also be stored in the data storage.

In the case of an "added in" form, information with respect to the location of the added paragraphs relative to elements in each of the earlier versions is also stored so that it is known where the added portions are in the source document relative to the pre-existing sections of that source document.

Furthermore, since the document structures of the source documents is hierarchical, changes are inherited. Thus, for modifications of the source document, inheritance is "upward". Thus, for example, if section 2.1 is modified in, for example, version 3, then section 2 is also modified with respect to any previous version.

With regard to deletions in the source document, such deletions are "downward" hierarchical. Thus, for example, if section 2 is deleted from the source document in version 3, this implies that section 2.1 in the earlier version of the source document is also deleted assuming that section 2.1 was present in the earlier version.

These inherited relationships are calculated and stored explicitly by the document management system. Alternatively, they can be inferred through use of a computer program that is using the document management system.

Figure 8:
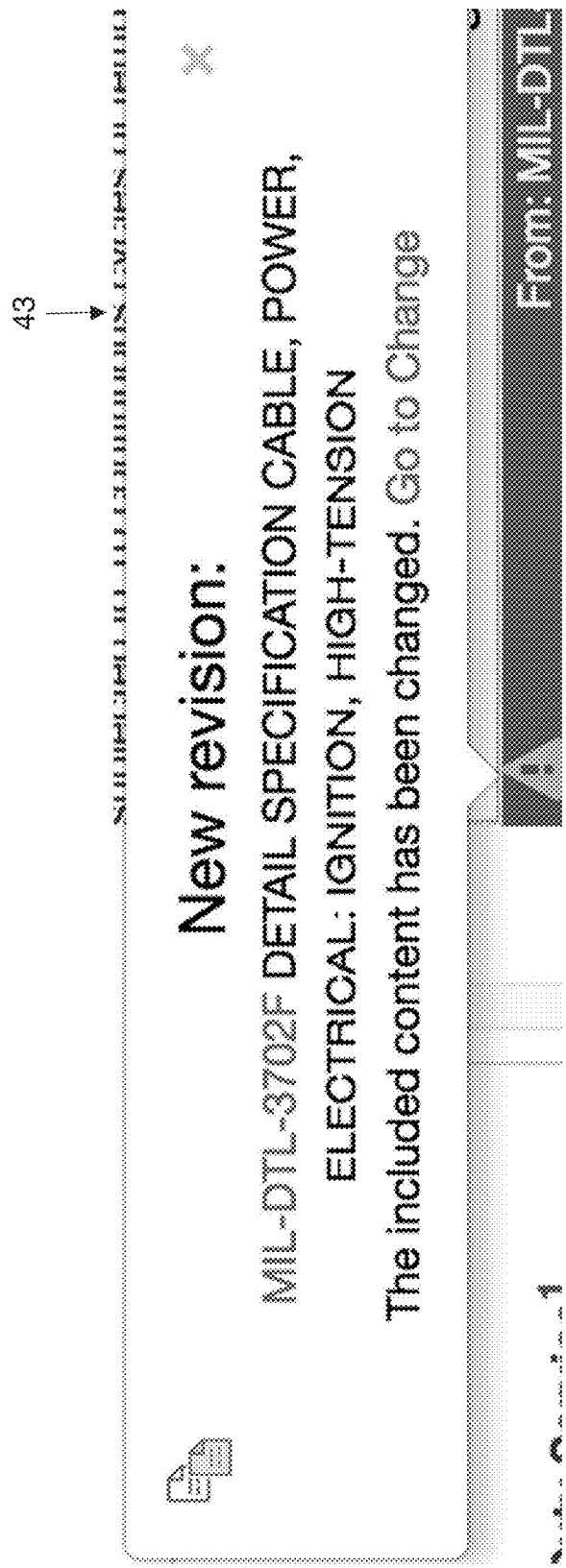
FIG. 8 illustrates a pop-up change notification showing an example where a newer revision (revision F) of a source document is available as compared to FIG. 7 (example shown in color).

The notifications generated at step 52 can be icons 39, 39' and 39" (see, for example, FIG. 12) and can also be a text type notification 43 as seen in FIGS. 8 and 11. When a tailored document is displayed, the user receives a notification for each component of the tailored document that is included by reference. For example, the notification will indicate whether that component has changed in a subsequent version of the source document. The user then has the option of seeing a red-line view of those changes as noted above and as shown in FIGS. 10 and 12. The user can select red-line icon 41 for invoking this function. The icons and red-line views of the changes are generated using the stored change information as calculated by the document management system and stored in the data storage.

Figure 5:
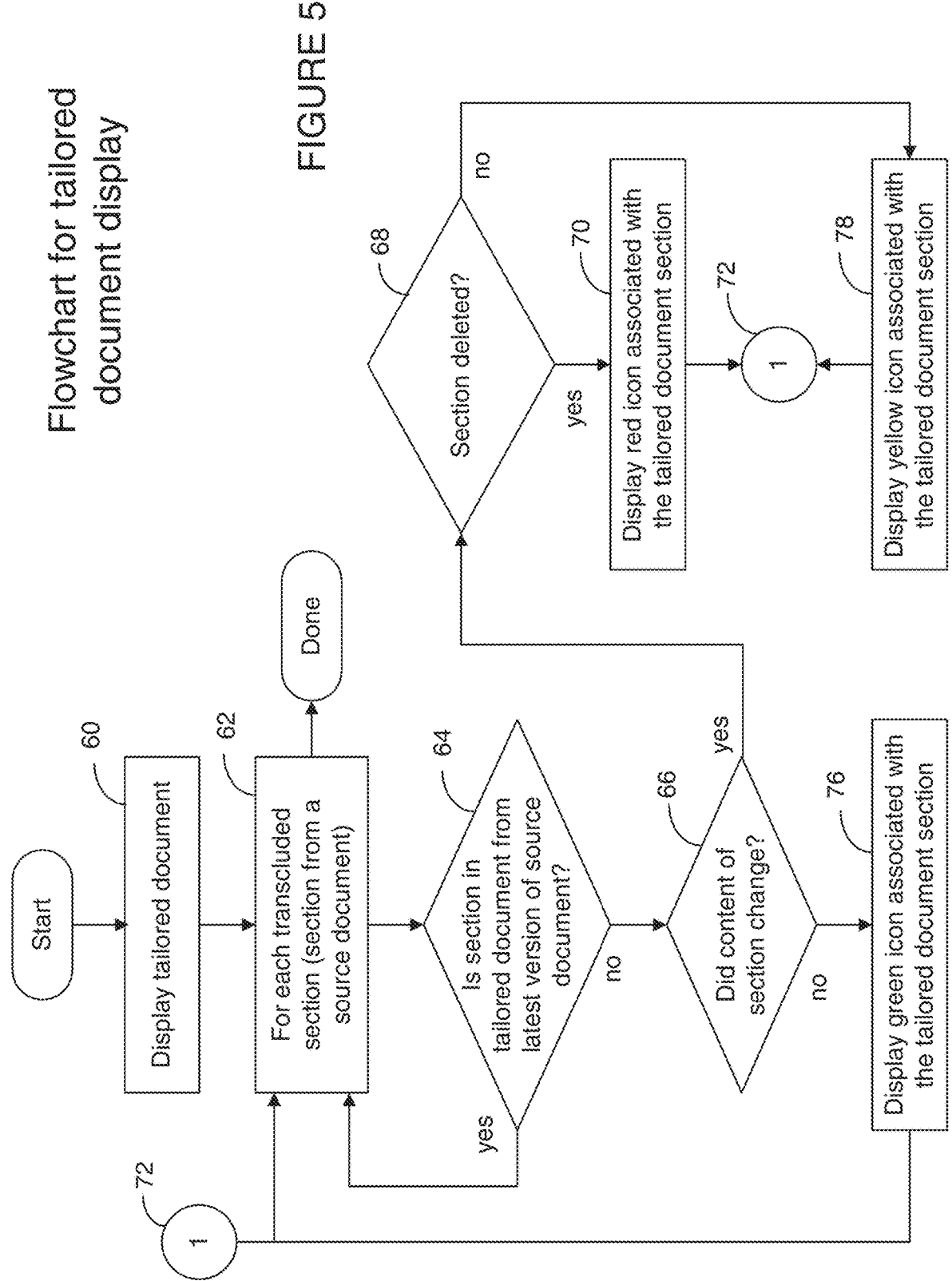
FIG. 5 is a flow chart of a tailored document display.

FIG. 5 is a flow chart for tailored document display. In this flow chart, the first step 60 is the display of a tailored document. At decisional step 64, a determination is made as to whether a section (portion) in the tailored (transcluded) document is from the latest revision of the source document. If the answer to this decisional step is YES, then this portion of the tailored document is up to date and the flow returns to the next portion in the transcluded document (step 62). From there, flow goes back to step 64 for the next portion of the transcluded document, etc.

If the answer to step 64 is NO, the flow proceeds to step 66 to determine if the content of the section of the source document which forms part of the tailored document has changed. If the answer is YES, the flow proceeds to decisional block 68; that is, is the "section deleted ?" step. If the section in the source document has changed via its deletion, the answer to decisional block 68 is YES and proceeds to step 70 which displays a red icon; that is, to display some indication on display 26 (see FIG. 1) via the document display module 48 to indicate to the user of the tailored document that the latest revision of the source document having a portion in the tailored document has had that particular portion deleted (see icon 39" in FIG. 12). The red icon 39" is displayed with the corresponding section (portion) deleted. The flow then proceeds back to step 62 (circled number 1 step 72).

If the answer to decisional block 66 is NO; that is, that the portion in question has not changed in the latest revision of the source document, the answer is to step 66 is NO, which proceeds to step 76 which in turn displays a green icon 39' on the user display 26 via the document display module 38 (see FIG. 1). The green icon 39' is displayed with the corresponding section (portion) that has not changed. Such a green icon 39' is shown in FIG. 12. For portions of a tailored document that are "deleted" (red icon) or "unchanged" (green icon), there is no red-line display. Thus, the red icon 39" indicates that the displayed portion of the tailored document is deleted in the latest revision of the corresponding source document. The user via user interface 25 (see FIG. 1) can then decide to accept this deletion or not.

If the answer to the section deleted block 68 is NO, the flow proceeds to step 78 which is the display yellow icon step which is then displayed on display 26 via the document display module 38 (see FIGS. 10 and 11 with respect to yellow icon 39). The yellow icon 39 is displayed associated with the corresponding section (portion) that has changed (see FIG. 11). Thus, the user is appraised that the section in question has changed from what was previously in the tailored document. Although steps 70, 76 and 78 represent displaying various colors for icons 39, 39' and 39" (see FIG. 12), of course other forms of notification to the user could be used; that is, whether color based, bold, italics or any other type of indication of a notification to apprise the user of the nature of the change in the source document relating to a portion incorporated in the tailored document.

Figure 6:
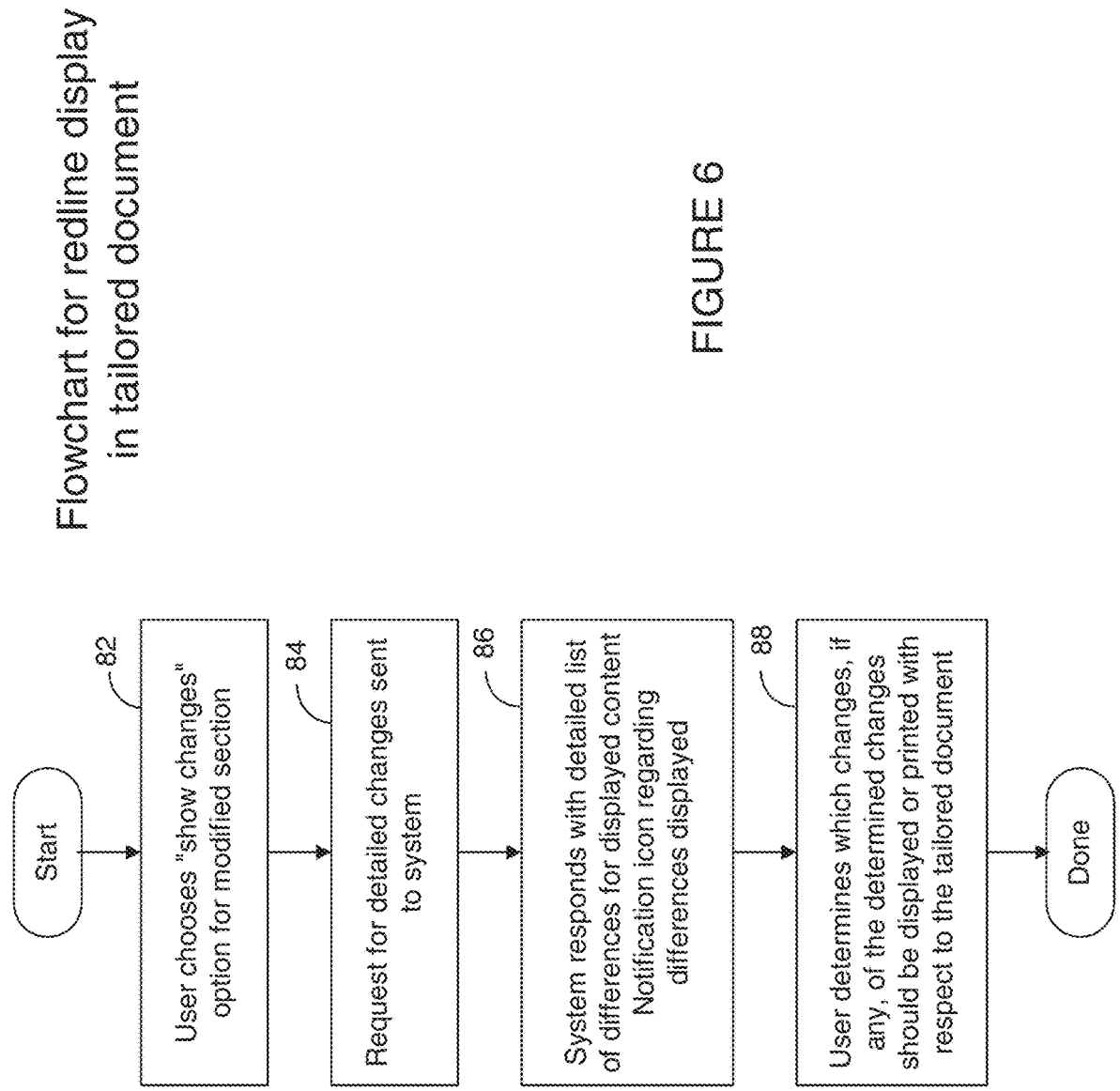
FIG. 6 is a flow chart for "redline" display in a tailored document.

FIG. 6 is a flow chart regarding the "red-line" display in the tailored document. If the user of the overall system chooses to show changes in the modified portions of the tailored document (step 82 via user interface 25—see FIG. 1 and see red-line icon 41 in FIG. 11), the system proceeds to step 84 which sends the user request to the document management system.

The system then responds with a detailed list of differences for displayed content; that is, portions of the tailored document having changes associated with changes in the new revision of the source document associated with those portions in the tailored document. Such changes, for example, can be those shown in the manner illustrated in FIGS. 7, 8 and 9 for the example previously described and in FIG. 10 for a second example. FIG. 12 shows a further example with green 39', yellow 39 and red 39" icons and red-line display of changes (for yellow icon 39).

FIG. 7 thus illustrates a portion of a tailored document showing sections from a source document (revision D) along with change notification icons on the left side of the source document section headers.

FIG. 8 illustrates a portion of a tailored document showing a pop-up change notification 43 informing that the previous revision (rev D) of the source document has a newer revision (version F) that is now available.

FIG. 9 illustrates a portion of a tailored document with red-line changes between revision D and revision F of the source document.

FIG. 12 is another example that illustrates red-line changes to a Section 1.1 of the tailored document.

Finally, with respect to FIG. 6, step 88 shows that a user (web client) can apply the some, none or all of the changes to the tailored document.

Thus, what has been described is an apparatus, method and computer program product for showing a user regarding a tailored document having one or more source documents from which one or more portions are used in the tailored document, modifications in those portions of the source document which are incorporated in the tailored document as a result of revision changes in the particular source document. The apparatus, method and computer program product not only calculates and stores the modifications in the source document portions incorporated in the tailored document, but can also notify the user of these modifications in the tailored document, including the differences between revisions of such portions, deletions of such portions or additions to such portions.

In this manner, the maintenance of tailored documents insofar as the source document portions contained therein may be modified as a result of revisions to those source document is readily recorded, allowing the user to have a complete overview of the tailored document and the source document portions contained therein.

What is claimed is:

1. A method for maintaining modification management of a tailored document based on transcluded portions of one or more source documents having revisions thereof stored in a document management system, comprising:

determining modifications in each revision of each source document;

storing said modifications; and notifying a user of the tailored document with respect to said determined modifications in each transcluded portion of the one or more source documents that is incorporated in the tailored document;

wherein said modifications include any changes to the transcluded portions of the source documents between revisions of the source document; and wherein determining modifications in each revision of each source document includes calculating the differences between each revision of the source document stored in the document management system, including each successive and non-successive revision of each source document stored in the document management system; and wherein determining modifications in each revision of each source document comprises determining difference data for each portion of each revision of each source document; and storing said modifications further comprises storing the difference data for each portion of the source document, wherein the portions include sections, titles, paragraphs, tables, and labels where present in the source document.

2. The method according to claim 1, wherein the difference data for each portion is stored in one of a "deleted in", "modified in", or "added in" form.

3. The method according to claim 2, wherein the step of notifying includes displaying revised transcluded portions of the tailored document for portions of a source document that have changed between revisions of the source document.

4. The method according to claim 3, wherein the revised transcluded portions of the source documents included in the transcluded document are displayed in a red-line manner.

5. The method according to claim 4, further comprising receiving user input regarding which, if any, of the modifications shall be incorporated in the tailored document.

6. The method according to claim 1, wherein determining modifications in each revision of each source document further comprises sequentially determining for each portion of the source document that has been changed whether that changed portion of the source document is used in the tailored document and, if so, the method further comprises generating and sending a notification to the user.

7. The method according to claim 1, wherein the step of notifying includes generating icons that identify the type of modification, and wherein the icons include an icon indicating that text in a portion of the tailored document has changed, another icon indicating that no change in a portion of the tailored document has occurred, and a further icon indicating that a portion of the tailored document has been deleted in the revision of the source document.

8. The method according to claim 1, wherein determining modifications in each revision of each source document comprises determining modifications to a document element, and wherein the determined modifications to a document element are stored in and annotated with one of:
a first form being an added in form identifying the addition of a section to the source document between revisions,
a second form being a modified in form indicating a modification to the source document between revisions, or
a third form being a deleted in form identifying a deletion of a section of the source document between revisions.

9. The method according to claim 1, wherein the step of notifying includes displaying text notifications.

10. The method according to claim 1, wherein each source document is hierarchical in structure and wherein each portion of the source document modified is inherited upwards and each portion of the source document modified by deletion is inherited downwards; and wherein inheritance relationships between portions of the source document are calculated and stored in the document management system.

11. An apparatus for maintaining modification management of a tailored document based on transcluded portions of one or more source documents having revisions thereof stored in a document management system, comprising:
a data storage including storage of a computer program code;
a central processing unit communicating with the data storage, the central processing unit under program control;
a display in communication with the central processing unit, the central processing unit configured to cause the apparatus to:
determine modifications in each revision of each source document; and
notify a user of the tailored document with respect to said determined modifications in each transcluded portion of the one or more source documents;
wherein said modifications include any changes to the transcluded portions of the one or more source documents between revisions of the source document; and wherein determining modifications in each revision of each source document includes calculating differences between each revision of the source document stored in the document management system, including each successive and non-successive revision of each source document;
wherein determining modifications in each revision of each source document comprises determining difference data for each portion of each revision of each source document; and storing said modifications further comprises storing the difference data for each portion of the source document, and
wherein the portions include sections, titles, paragraphs, tables, and labels where present in the source document.

12. The apparatus according to claim 11, wherein the determined modifications in each revision of each source document includes calculated differences between successive revisions of each source document.

13. The apparatus according to claim 12, wherein the notifying includes displaying revised transcluded portions of the tailored document for portions of a source document that have changed between revisions of the source document.

14. The apparatus according to claim 13, wherein the revised transcluded portions of the source documents included in the transcluded document are displayed in a red-line manner.

15. The apparatus according to claim 14, further comprising a user interface to receive user inputs, including user input with respect to which, if any, of the modifications should be incorporated in the tailored document.

16. The apparatus according to claim 11, wherein said notify a user includes generating icons that identify the type of modification.

17. The apparatus according to claim 16, wherein the icons include an icon indicating that text in a portion of the tailored document has changed, another icon indicating that no change in a portion of the tailored document has occurred, and a further icon indicating that a portion of the tailored document has been deleted in the revision of the source document.

18. The apparatus according to claim 17, wherein determining modifications in each revision of each source document comprises determining modifications to a document element, and wherein the determined modifications to a document element are stored in and annotated with one of:

a first form being an added in form identifying the addition of a section to the source document between revisions, a second form being a modified in form indicating a modification to the source document between revisions, or a third form being a deleted in form identifying a deletion of a section of the source document between revisions.

19. The apparatus according to claim 11, wherein said notify a user includes displaying text notifications.

20. The apparatus according to claim 11, wherein each source document is hierarchical in structure and wherein each portion of the source document modified is inherited upwards and each portion of the source document modified by deletion is inherited downwards; and wherein inheritance relationships between portions of the source document are calculated and stored in the document management system.

21. A computer program product embodied on a non-transitory computer readable memory, comprising computer program code configured to perform maintaining modification management of a tailored document based on transcluded portions of one or more source documents having revisions thereof stored in a document management system, and further configured to:

determine modifications in each revision of each source document; and notify a user of the tailored document with respect to said determined modifications in each transcluded portion of the one or more source documents;

wherein said modifications include any changes to the transcluded portions of the one or more source documents between revisions of the source document; and wherein determining modifications in each revision of each source document includes calculating differences between each revision of the source document stored in the document management system, including each successive and non-successive revision of each source document stored in the document management system; and wherein determining modifications in each revision of each source document comprises determining difference data for each portion of each revision of each source document; and storing said modifications further comprises storing the difference data for each portion of the source document, wherein the portions include sections, titles, paragraphs, tables, and labels where present in the source document.

22. The computer program product according to claim 21, wherein determining modifications in each revision of each source document further includes calculating the difference between successive revisions of each source document.

23. The computer program product according to claim 22, wherein the step of notifying includes displaying revised transcluded portions of the tailored document for portions of a source document that have changed between revisions of the source document.

24. The computer program product according to claim 23, wherein the revised transcluded portions of the source documents included in the transcluded document are displayed in a red-line manner.

25. The computer program product according to claim 24, further configured to receive user inputs, including user input with respect to which, if any, of the modifications should be incorporated in the tailored document.

26. The computer program product according to claim 21, wherein said notify a user includes generating icons that identify the type of modification.

27. The computer program product according to claim 26, wherein the icons include an icon indicating that text in a portion of the tailored document has changed, another icon indicating that no change in a portion of the tailored document has occurred, and a further icon indicating that a portion of the tailored document has been deleted in the revision of the source document.

28. The computer program product according to claim 27, wherein determining modifications in each revision of each source document comprises determining modifications to a document element, and wherein the determined modifications to a document element are stored in and annotated with one of:

a first form being an added in form identifying the addition of a section to the source document between revisions, a second form being a modified in form indicating a modification to the source document between revisions, or a third form being a deleted in form identifying a deletion of a section of the source document between revisions.

29. The computer program product according to claim 21, wherein said notify a user includes displaying text notifications.

30. The computer program product according to claim 21, wherein each source document is hierarchical in structure and wherein each portion of the source document modified is inherited upwards and each portion of the source document modified by deletion is inherited downwards; and wherein inheritance relationships between portions of the source document are calculated and stored in the document management system.

* * * * *